(12) United States Patent
Kim et al.

(10) Patent No.: US 6,841,941 B2
(45) Date of Patent: Jan. 11, 2005

(54) BRIGHTNESS CONTROLLABLE FLASHLIGHTS

(75) Inventors: Paul Y. Kim, Westminster, CA (US); William A. Hunt, Foothill Ranch, CA (US)

(73) Assignee: SureFire, LLC, Fountain Valley, CA (US)

(*) Notice: Subject to any disclaimer, the term of this patent is extended or adjusted under 35 U.S.C. 154(b) by 57 days.

(21) Appl. No.: 10/346,537

(22) Filed: Jan. 16, 2003

(65) Prior Publication Data

US 2004/0140771 A1 Jul. 22, 2004

(51) Int. Cl.⁷ .............................................. H05B 37/00
(52) U.S. Cl. ........................ 315/86; 315/241; 362/205
(58) Field of Search ........................... 315/51, 86, 241, 315/312; 362/183, 184, 191, 187, 247, 205, 206; 354/33, 35

(56) References Cited

U.S. PATENT DOCUMENTS

| | | | |
|---|---|---|---|
| 1,214,583 A | 2/1917 | Persons | 362/247 |
| 1,226,325 A | 5/1917 | Geromanos | 362/247 |
| 1,287,611 A | 12/1918 | Barnes | 362/247 |
| 1,361,557 A | 12/1920 | Wheat | 362/21 |
| 1,423,911 A | 7/1922 | Cardwell | 362/184 |
| 1,448,352 A | 3/1923 | Barany et al. | 362/184 |
| 1,559,930 A | 11/1925 | Bean | 362/510 |
| 1,889,936 A | 12/1932 | Shannon | 362/184 |
| 2,097,222 A | 10/1937 | Thomkins et al. | 362/87 |
| 2,190,035 A | 2/1940 | Loungway | 362/227 |
| 2,408,643 A | 10/1946 | Hoy | 362/184 |
| 3,596,078 A | 7/1971 | Owens | 362/184 |
| 3,999,193 A | * 12/1976 | Hasegawa | 354/33 |
| 4,135,230 A | 1/1979 | Armbruster | 362/206 |
| 4,211,955 A | 7/1980 | Ray | 315/53 |
| 4,249,234 A | 2/1981 | Park et al. | 362/228 |
| 4,290,095 A | 9/1981 | Schmidt | 362/191 |

(List continued on next page.)

OTHER PUBLICATIONS

NiteRider Digital Explorer Instruction Manual, Mar. 3, 1998.
Microchip Technology Inc., Data Sheet PIC12C67X, 1999.
International Recitifier, Data Sheet IRL3803S/L, Aug. 25, 1997.
National Semiconductor, Data Sheet LP2950/LP2951, Jul. 2000.
William Hunt, "Pulse Width Modulated Voltage Regulator for Electric Caving Lamps", Apr. 12, 1995.
William Hunt, "Willie Hunt's Lightbulb Voltage Regulators", prior to Dec. 1. 2001.

*Primary Examiner*—Tuyet Vo
*Assistant Examiner*—Jimmy T Vu
(74) *Attorney, Agent, or Firm*—David Weiss

(57) ABSTRACT

Flashlights having selectively controllable brightness levels, preferred embodiments of which comprise in combination: a battery; a switch having an OFF position not connected to the battery, a first ON position connected to the battery, and a second ON position connected to the battery; an electrical component (such as a resistor or an inductor) in circuit with the battery when the switch is in its first ON position and not in circuit with the battery when the switch is in its second ON position; a light emitter assembly; and a controller in circuit with the battery, the switch and the light emitter assembly, for detecting whether or not the electrical component is in circuit with the battery when the switch is in either one of its first ON position and its second ON position, and for controlling electrical power to the light emitter assembly for producing a first light output when the electrical component is detected and for producing a second light output when the electrical component is not detected.

104 Claims, 10 Drawing Sheets

U.S. PATENT DOCUMENTS

| | | | | |
|---|---|---|---|---|
| 4,332,445 A | * | 6/1982 | Hosono | 354/106 |
| 4,346,329 A | | 8/1982 | Schmidt | 315/51 |
| 4,386,391 A | | 5/1983 | Gulliksen et al. | 362/232 |
| 4,388,673 A | | 6/1983 | Maglica | 362/183 |
| 4,499,525 A | | 2/1985 | Mallory | 362/157 |
| 4,527,223 A | | 7/1985 | Maglica | 362/187 |
| 4,530,034 A | | 7/1985 | Kawarada | 362/9 |
| 4,581,686 A | | 4/1986 | Nelson | 362/204 |
| 4,605,993 A | | 8/1986 | Zelina, Jr. | 362/183 |
| 4,677,533 A | | 6/1987 | McDermott et al. | 362/240 |
| 4,760,504 A | | 7/1988 | Schaller et al. | 362/205 |
| 4,783,725 A | | 11/1988 | Schaller et al. | 362/157 |
| 4,788,633 A | | 11/1988 | Zimermann et al. | 362/296 |
| 4,803,605 A | | 2/1989 | Schaller et al. | 362/184 |
| 4,841,417 A | | 6/1989 | Maglica et al. | 362/206 |
| 4,876,416 A | | 10/1989 | Frantz et al. | 200/11 R |
| 4,914,555 A | | 4/1990 | Gammache | 362/183 |
| 4,947,291 A | | 8/1990 | McDermott | 362/19 |
| 4,963,798 A | | 10/1990 | McDermott | 315/312 |
| 4,985,813 A | | 1/1991 | Putman | 362/186 |
| 5,003,440 A | | 3/1991 | Maglica | 562/158 |
| 5,077,644 A | | 12/1991 | Schaller et al. | 362/184 |
| 5,081,568 A | | 1/1992 | Dong et al. | 362/184 |
| 5,161,879 A | | 11/1992 | McDermott | 362/206 |
| 5,174,648 A | | 12/1992 | Clary et al. | 362/228 |
| 5,345,370 A | * | 9/1994 | Murray et al. | 362/205 |
| 5,359,779 A | | 11/1994 | Polk et al. | 42/115 |
| 5,590,951 A | | 1/1997 | Matthews | 362/205 |
| 5,629,105 A | | 5/1997 | Matthews | 429/97 |
| 5,642,932 A | | 7/1997 | Matthews | 362/206 |
| 5,685,637 A | | 11/1997 | Chapman et al. | 362/263 |
| 5,722,755 A | | 3/1998 | Slape | 362/11 |
| 5,821,697 A | | 10/1998 | Weber | 315/200 A |
| 5,871,272 A | | 2/1999 | Sharrah et al. | 362/184 |
| 5,984,494 A | | 11/1999 | Chapman et al. | 362/470 |
| 6,019,482 A | | 2/2000 | Everett | 362/184 |
| 6,046,572 A | | 4/2000 | Matthews et al. | 320/116 |
| 6,095,661 A | | 8/2000 | Lebens et al. | 362/184 |
| 6,183,105 B1 | | 2/2001 | Parker | 362/183 |
| 6,296,367 B1 | | 10/2001 | Parsons et al. | 362/183 |
| 6,386,730 B1 | | 5/2002 | Matthews | 362/186 |

* cited by examiner

BRIGHTNESS CONTROLLABLE FLASHLIGHTS

FIELD OF THE INVENTION

This invention relates to flashlights, and more particularly to flashlights with selectably controllable brightness levels.

BACKGROUND OF THE INVENTION

Handheld flashlights with selectably actuable brightness levels are known in the prior art, as are flashlights with multiple light emitters including incandescent light bulbs and light emitting diodes. Such flashlights permit a user to perform tasks under portable light conditions selected for the particular task. Nevertheless, the need exists for improvements in such flashlights for increasing their adaptability to varied environments and purposes.

SUMMARY OF THE INVENTION

In accordance with a principal aspect of the present invention, flashlights with at least two user-selectable brightness levels are provided, the brightness level and its selection being in response to manual actuation of a switch which is preferably situated in the flashlight's tail cap.

Preferred embodiments of the invention provide, in a flashlight, the combination comprising: a battery; a switch having an OFF position not connected to the battery, a first ON position connected to the battery, and a second ON position connected to the battery; an electrical component in circuit with the battery when the switch is in its first ON position and not in circuit with the battery when the switch is in its second ON position; a light emitter assembly; and a controller in circuit with the battery, the switch and the light emitter assembly, for detecting whether or not the electrical component is in circuit with the battery when the switch is in either one of its first ON position and its second ON position, and for controlling electrical power to the light emitter assembly for producing a first light output when the electrical component is detected and for producing a second light output when the electrical component is not detected. The controller preferably also regulates power to the light emitter assembly for providing constant brightness of at least one of the first and second light outputs. The controller, in one preferred aspect of the invention, abruptly reduces power to the light emitter assembly when the battery is near exhaustion, abruptly reducing light output of the light emitter assembly, for signaling that the battery is near exhaustion and for facilitating battery replacement.

The flashlight includes a switch actuator for placing the switch alternatively in its OFF position, its first ON position and its second ON position. The actuator preferably includes a pushbutton depressible by a first distance placing the switch in its first ON position and depressible by a second distance placing the switch in its second ON position.

The electrical component in circuit with the battery, and which presence is detected by the controller for determining switch position, may comprise a resistor or an inductor in circuit with the battery when the switch is in its first ON position and is shorted out of the circuit when the switch is in its second ON position.

In one preferred embodiment according to the present invention, the light emitter assembly includes an incandescent lamp connected to the controller and at least one light emitting diode (LED) connected to the battery through the switch, the at least one LED being powered by the battery for producing light output when the switch is in its first ON position, the controller delivering power to the incandescent lamp for producing light output when the switch is in its second ON position but not when the switch is in its first ON position. The at least one LED may be powered by the battery for producing light output when the switch is in its second ON position as well as when the switch is in its first ON position.

In a second preferred flashlight embodiment, the light emitter assembly includes an incandescent lamp connected to the controller, the controller delivering power to the incandescent lamp for producing the first light output when the switch is in its first ON position and for producing the second light output when the switch is in its second ON position.

In a third preferred flashlight embodiment, the light emitter assembly includes two incandescent lamps connected to the controller, the controller delivering power to one of the incandescent lamps for producing light output when the switch is in its first ON position, the controller delivering power to the other of the incandescent lamps (or to both of the incandescent lamps) for producing light output when the switch is in its second ON position.

In a yet another preferred flashlight embodiment, the light emitter assembly includes an LED connected to the controller, the controller controlling power to the LED for producing the first light output when the switch is in its first ON position and for producing the second light output when the switch is in its second ON position.

Preferably, in each of the above-mentioned preferred flashlight embodiments, the flashlight includes a battery housing for the battery, with the light emitter assembly situated at the front end of the battery housing; and a tail cap assembly is coupled to the battery housing at its rear end, the tail cap assembly including the switch and the electrical component. The controller, which is preferably situated at the battery housing's front end in proximity to the light emitter assembly, communicates with the tail cap switch and with the electrical component through a conductive path along the battery housing. The tail cap assembly includes a switch actuator, preferably a pushbutton depressible by a first distance placing the switch in its first ON position and depressible by a second distance placing the switch in its second ON position.

In a preferred embodiment of the tail cap switch, a contact member is coupled through the electrical component to the rear terminal of the battery in the battery housing, the contact member including at least one resilient arm spaced from the conductive rear edge of the battery housing when the switch is in its OFF position, the resilient arms being in conductive contact with the battery housing's conductive rear edge when the switch is in its first ON position, the resilient arms being in conductive contact with the battery housing's conductive rear edge and with the rear terminal of the battery shorting out the electrical component when the switch is in its second ON position. The flashlight includes a switch actuator in the tail cap assembly, preferably provided by a pushbutton depressible by a first distance for urging the contact member's resilient arms in conductive contact with the conductive rear edge of the battery housing, and for placing the conductive member's resilient arms in conductive contact with the conductive rear edge of the battery housing and with the rear terminal of the battery shorting out the electrical component.

Another aspect of the present invention provides, in a flashlight, the combination comprising: a battery; a switch having an OFF position not connected to the battery, a first ON position connected to the battery, and a second ON position connected to the battery; a light emitter assembly; a controller in circuit with the battery, the switch and the light emitter assembly, such controller controlling electrical power to the light emitter assembly for producing a first light output when the switch is in its first ON position and for producing a second light output when the switch is in its second ON position; and a switch actuator coupled to the switch and translatable by a first distance placing the switch in its first ON position and translatable by a second distance placing the switch in its second ON position. The switch actuator preferably includes a pushbutton depressible by such first distance placing the switch in its first ON position and depressible by such second distance placing the switch in its second ON position.

A further aspect of the present invention includes a method of indicating near exhaustion of the battery in a flashlight including a light emitter, the method comprising: regulating power from the battery to the light emitter for providing constant brightness of light output over time; detecting near exhaustion of the battery; abruptly reducing power to the light emitter for providing an abrupt decrease in light output when near exhaustion of the battery is detected; and, preferably, regulating the reduced power to the light emitter for providing constant brightness of the decreased light output. During the first regulating step, the method periodically corrects duty cycle for maintaining the constant brightness of light output over time; and during the detecting step, the method detects when the duty cycle is at a predetermined level (such as near 100%) corresponding to near exhaustion of the battery. During the reducing step, the light output is abruptly reduced to approximately 20% of the light output provided during the regulating step.

BRIEF DESCRIPTION OF THE DRAWINGS

The novel features believed to be characteristic of the invention, together with further advantages thereof, will be better understood from the following description considered in connection with the accompanying drawings in which preferred embodiments of the present invention are illustrated by way of example. It is to be expressly understood, however, that the drawings are for the purpose of illustration and description only and are not intended as a definition of the limits of the invention.

DETAILED DESCRIPTION OF THE PREFERRED EMBODIMENTS

Figure 1:
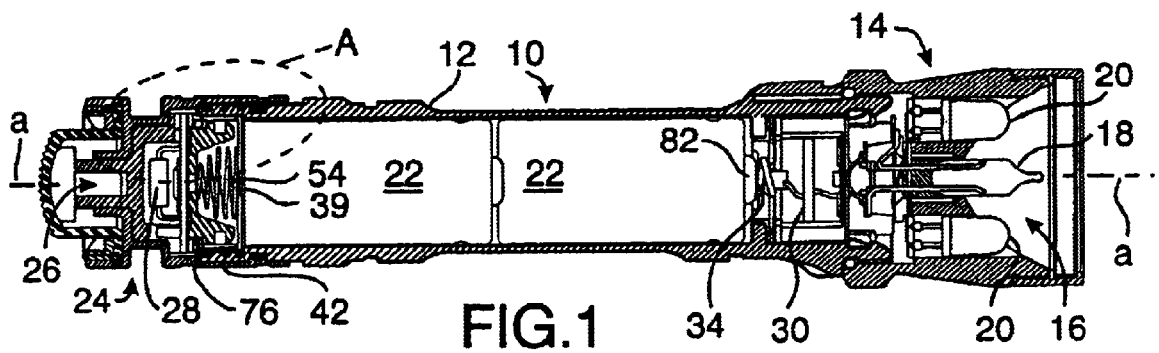
FIG. 1 is a side generally cross-sectional view of a first preferred embodiment of a flashlight apparatus according to the present invention.

Turning to FIG. 1, there is shown a preferred embodiment of a flashlight 10 according to the present invention, which may be conveniently held in the hand of a user. The flashlight 10 includes a generally cylindrical battery housing 12, a head 14 at the flashlight's front end including a light emitter assembly 16 with an incandescent lamp 18 and at least one light emitting diode (LED) 20 in electrical circuit with one or more battery cells 22 in the battery housing 12. A rear or tail cap assembly 24 includes a switch assembly 26 for actuating the circuit to energize the light emitter assembly 16 for producing two levels of brightness. Flashlights including two or more light emitters with tail cap actuation of switching devices for effecting two or more brightness levels are disclosed in U.S. Pat. Nos. 5,629,105 and 6,386,730, issued to John W. Matthews and owned by the assignee of the present invention, the disclosures of which patents are incorporated herein by reference.

Figure 2:
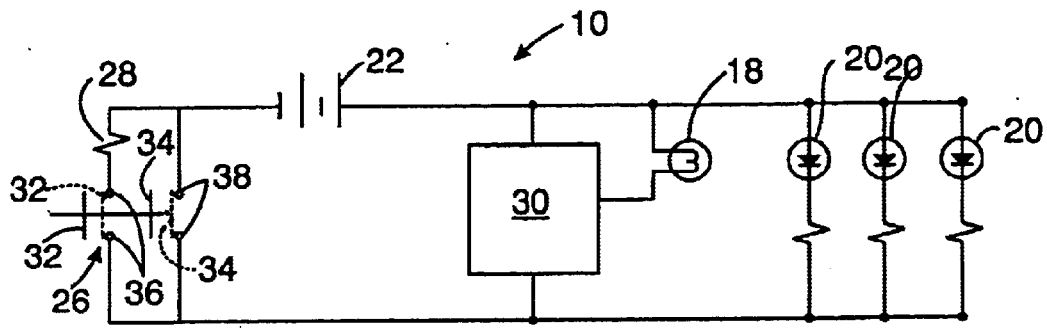
FIG. 2 is a schematic diagram of the flashlight of FIG. 1.

In accordance with the present invention and considering FIG. 2, the tail cap assembly 24 includes an electrical component—such as the resistor 28 shown in the preferred flashlight embodiment of FIG. 1—which may be placed alternatively in circuit and out of circuit with the battery 22 by a user's selective actuation of the switch assembly 26. Switch 26 has an OFF position in which the switch is not connected to the battery 22 (schematically represented by the solid-line contacts 32 and 34 spaced from their respective switch contacts 36 and 38), a first ON position connected to the battery 22 (schematically represented by the dashed-line contact 32 in contact with its switch contacts 36 while contact 34 is not in contact with contacts 38), and a second ON position connected to the battery 22 (schematically represented by the dashed-line contact 34 in contact with its switch contacts 38 irrespective of whether contact 32 is in contact with contacts 36). When the switch 26 is in its first ON position, the resistor 28 is in series circuit with the battery 22; and when the switch 26 is in its second ON position, the resistor 28 is not in circuit with the battery 22.

The flashlight 10 is provided with a controller 30 in circuit with the battery 22, the switch assembly 26 and the light emitter assembly 16. While the switch assembly 26 and resistor 28 are preferably located in the tail cap assembly 24 at the rear of the battery housing 12, the controller 30 is preferably a printed circuit assembly located at the front end of the battery housing 12 in proximity to the light emitter assembly 16. A conductive path along the battery housing 12, such as by the housing being fabricated of a metal (e.g. aluminum) or by the housing 12 having a metallic sleeve, electrically couples one terminal 39 of the battery 22 with the controller 30 and light emitter assembly 16 through the switch assembly 26 and resistor 28.

When the switch assembly 26 is in its OFF position, there is no power to the controller 30 and to the light emitter assembly 16. As will be later described in greater detail, when the switch assembly 26 is actuated by a user to either one of its ON positions, the controller 30 determines which of the two ON positions is actuated by detecting whether the resistor is in series circuit, providing power only to the LEDs 20 if the resistor 28 is detected (i.e. if the switch's first ON position is actuated) and providing power to both the LEDs 20 and the incandescent lamp 18 if the resistor 28 is not detected (i.e. if the switch's second ON position is actuated).

The tail cap and switch assemblies 24, 26 and their operation will be described in connection with FIGS. 3–14 in addition to FIGS. 1 and 2. The tail cap assembly 24 includes an internally threaded rear cap 40 threadedly engaging the externally threaded rear end portion 42 of the cylindrical battery housing 12. By such threaded engagement, the rear cap 40 may be rotated about the longitudinal axis a of the battery housing 12, such rotation causing translational displacement of the tail cap assembly 24 with respect to the battery housing 12 along the longitudinal axis a.

Figures 3, 4:
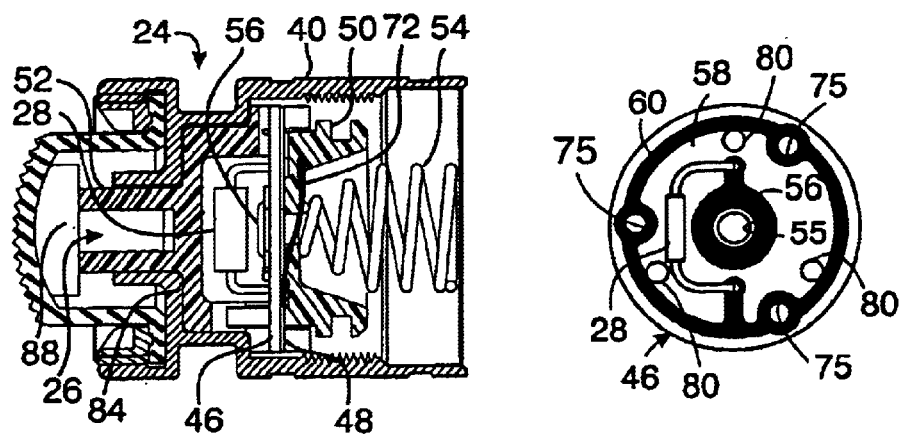
FIG. 3 is a side generally cross-sectional view of a tail cap assembly of the flashlight of FIG. 1, shown in increased scale for ease of description.
FIG. 4 is a view of the rear face of an example of a circuit board included in the tail cap assembly of FIG. 3.
Figure 5:
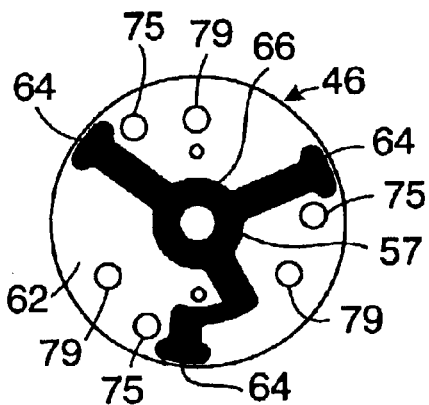
FIG. 5 is a view of the front face of the circuit board of FIG. 4.
Figure 6:
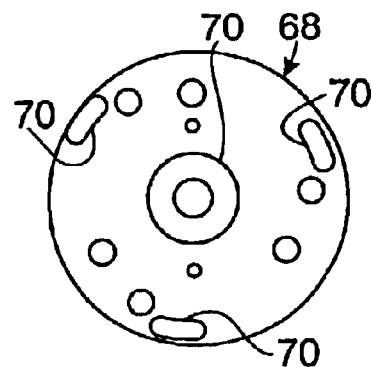
FIG. 6 is a front view of a solder mask applied to the circuit board front face shown in FIG. 5.
Figure 7:
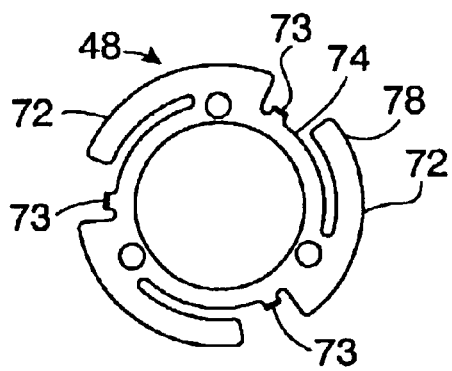
FIG. 7 is a rear view of a contact washer included in the tail cap of FIG. 3.

The tail cap assembly 24 includes a circuit board assembly 44 including a circuit board 46 (such as a printed circuit board) and switch contact member or washer 48 secured between a battery rear terminal contact spring retainer 50 and a pushbutton retainer 52. The battery terminal contact spring 54 is secured to the spring retainer 50 and to a central conductive portion 55 of the circuit board 46 by a conductive eyelet 56 extending through a central aperture 57 in the circuit board 46 and to the circuit board's rear face 58 (FIGS. 3 and 4). One end of the resistor 28 is soldered to the conductive portion 55 and is thereby conductively connected to the eyelet 56 and hence to the battery terminal contact spring 54, while the other end of the resistor 28 is soldered to a closed conductive path 60 adjacent to the circumference of the circuit board's rear face 58.

The front face 62 (FIG. 5) of the circuit board 46 has printed thereon at least one and preferably three conductive pads 64 conductively extending to a conductive central portion 66 in conductive contact with the eyelet 56 and hence with the rear face conductive central portion 55 and the battery terminal contact spring 54.

A nonconductive solder mask 68 (FIG. 6) is superimposed upon the circuit board's front face 62 rearwardly of the switch contact washer 48. The solder mask 68 includes apertures 70 therethrough corresponding to the conductive pads 64 and the central conductive area 66 on the circuit board's front face 62.

Figure 8:
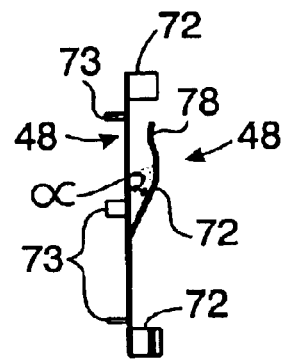
FIG. 8 is a side view of the contact washer of FIG. 7.
Figure 9:
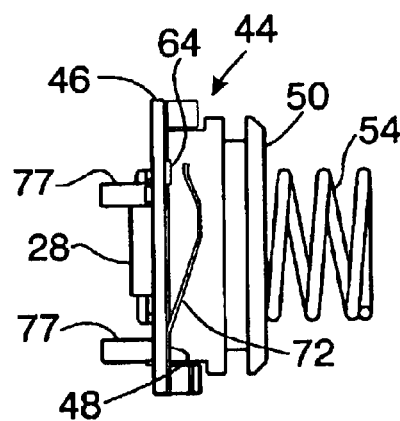
FIG. 9 is a side view of the switching contacts/circuit board assembly of FIG. 3.

The switch contact washer 48 (FIG. 7) comprises an annular conductive member with at least one and preferably three flexible resilient arcuate arms 72 along the washer's periphery and projecting from the washer base portion 74 along a forwardly acute angle $\alpha$ (FIG. 8). The contact washer 48 is secured to the circuit board 46 and is in conductive engagement with the conductive path 60 on the circuit board's rear surface 58, by means of washer tabs 73 extending from the washer base portion 74 and through respective apertures 75 in the circuit board 46, and soldered to the conductive path 60. The spring retainer 50 is fixedly secured to the pushbutton retainer 52, with the central portion of the circuit board 46 and the contact washer base portion 74 sandwiched therebetween, by means of spring retainer rearward projections 77 extending through apertures 80 in the circuit board 46 and fastened to the pushbutton retainer 52.

The diameter of the contact washer 48 and the projection profile of each of the arms 72 are such that the arms 72 are brought into conductive contact with the conductive rear edge 76 of the battery housing 12 when the circuit board assembly 44 is forwardly displaced or translated by a first predetermined distance along the longitudinal axis a, and further forward displacement or translation of the circuit board assembly 44 by a second predetermined distance causes respective pads 64 to come into conductive contact with the end portions 78 of the resilient arms 72. The switch contact washer 48, in one example, was constructed of a nickel-plated approximately 0.006 inch thick beryllium copper alloy.

With the batteries 22 in circuit in the battery housing 12 (as in FIG. 1), the rear battery terminal 39 contacts the battery rear contact spring 54 while the front battery terminal 82 contacts the front battery terminal contact spring 83 connected to the controller 30 and light emitters 18, 20 as schematically shown in FIG. 2. The consequent axial compression of the rear spring 54 rearwardly biases the circuit board assembly 44 and its secured pushbutton retainer 52 against a forwardly facing internal shoulder 84 of the tail cap 40.

Figure 10:
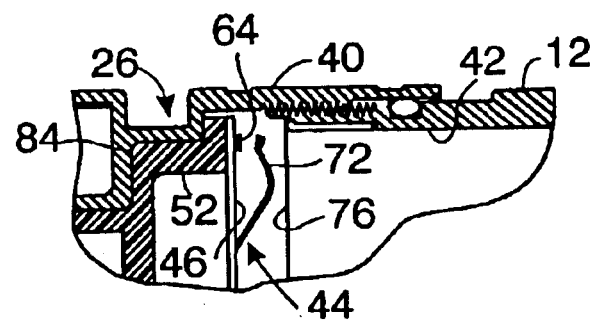
FIG. 10 shows a fragment of the flashlight of FIG. 1, generally within the area bounded by the dashed line A of FIG. 1 and greatly enlarged, representing the tail cap switch assembly in an OFF position.

FIG. 10 shows the tail cap switch 26 in its OFF position, when the tail cap 40 is threaded onto the rear threaded portion of the battery housing 12 such that the flexible contact washer arms 72 are not in contact engagement with the rear edge 76 of the conductive battery housing 12. For convenience of description, the spring retainer 50 and spring 54 of the circuit board assembly 44 are not shown in FIGS. 10–14.

The first ON position of the tail cap switch 26 is effected by forwardly moving the circuit board assembly 44 against the bias of the battery rear terminal contact spring 54, until the contact washer arms 72 come into contact engagement with the battery housing conductive rear edge 76. This may be accomplished either by the user's rotating the tail cap 40 in one direction with respect to the battery housing 12 which results in forward translatory displacement of the tail cap 40 by a first distance and hence of the pushbutton retainer/circuit board assembly combination 52, 44 against the bias of the spring 54, as indicated by the arrow 86 in FIG. 11; or by the user's depressing or manually forwardly urging the tail cap's pushbutton 88 by a first distance which results in forward translation or displacement of the pushbutton retainer/circuit board assembly combination 52, 44 from the tail cap shoulder 84 and against the bias of the spring 54, as indicated by the arrow 89 in FIG. 13. When switch actuation is accomplished by pushbutton depression, the user's release of the pushbutton 88 permits the pushbutton retainer/circuit board assembly combination 52, 44 to be urged rearwardly by the bias of the spring 54 to the switch's OFF position shown in FIG. 10.

The second ON position of the tail cap switch 26 is effected upon forward displacement of the circuit board assembly 44 until the contact washer arms 72 are in contact engagement with the respective circuit board pads 64 as well as in contact engagement with the battery housing conductive rear edge 76. This may be accomplished by continuing to threadedly rotate the tail cap 40 upon the battery housing threaded rear end portion 42, thereby forwardly displacing or translating the tail cap 40 by a second distance along with the pushbutton retainer/circuit board assembly combination 52, 44 against the bias of the spring 54, until—with the contact washer arms 72 remaining in contact engagement with the battery housing rear edge 76—the pads 64 contact the end portions 78 of the contact washer arms 72 respectively. Alternatively, the user may depress or manually forwardly urge the tail cap pushbutton 88 by a second distance for forwardly displacing the pushbutton retainer/circuit board assembly combination 52, 44 away from the tail cap shoulder 84 against the bias of the spring 54, until the pads 64 respective contact the end portions 78 of the contact washer arms 72 while the contact washer arms 72 remain in contact engagement with the battery housing rear edge 76, as shown in FIG. 14. When the second ON position is pushbutton actuated, the user may partially release the pushbutton 88 to effect the first ON position shown in FIG. 13 or he may fully release the pushbutton 88 to effect the OFF position shown in FIG. 10.

Figure 11:
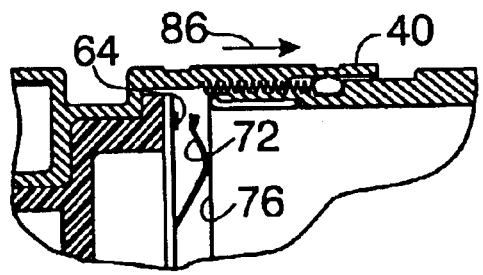
FIG. 11 is a fragmentary representation similar to FIG. 10, showing the tail cap switch assembly in a rotary actuated first ON position.

When the first ON position has been effected through forward translation by rotating the tail cap 40 as shown in FIG. 11, the switch's OFF position of FIG. 10 may be effected by the user's reversely rotating the tail cap 40 with respect to the battery housing for translating the tail cap 40 in the rearward direction (opposite the arrow 86). Similarly, when the switch 26 is in its second ON position shown in FIG. 12, the switch may be placed in its first ON position of FIG. 11 or in its OFF position of FIG. 10 by reverse rotation and rearward translation of the tail cap 40 with respect to the battery housing 12.

When the first ON position has been effected by forward rotation of the tail cap 40 as shown in FIG. 11, the switch second ON position may be pushbutton actuated. The user's release of the pushbutton 88 will return the switch 26 to its first ON position as shown in FIG. 11.

Figure 12:
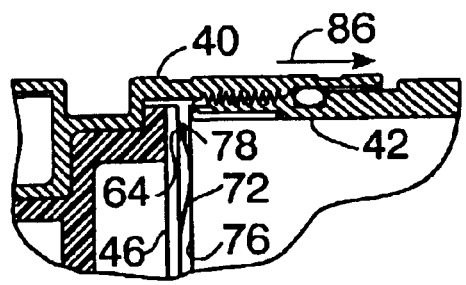
FIG. 12 is a fragmentary representation similar to FIG. 10, showing the tail cap switch assembly in a rotary actuated second ON position.
Figure 13:
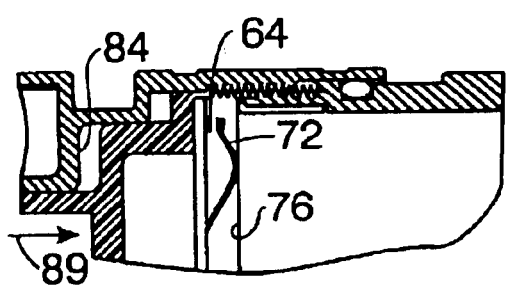
FIG. 13 is a fragmentary representation similar to FIG. 10, showing the tail cap switch assembly in a pushbutton actuated first ON position.
Figure 14:
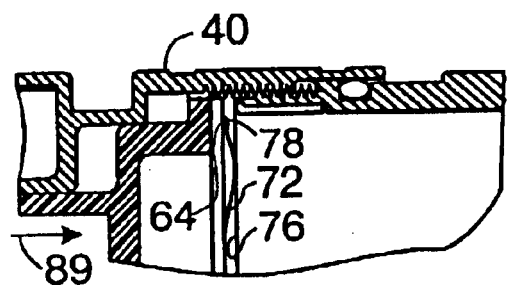
FIG. 14 is a fragmentary representation similar to FIG. 10, showing the tail cap switch assembly in a pushbutton actuated second ON position.

When the tail cap switch 26 is in its first ON position shown in FIG. 11 or FIG. 13, the contact engagement between the contact washer 48 and the conductive battery housing 12 completes the circuit of FIG. 2 with the resistor 28 in circuit between the battery 22 and the load (controller 30 and light emitters 18, 20). When the switch 26 is in its second ON position shown in FIG. 12 or FIG. 14, the resistor 28 is shorted out of the circuit, and the battery 22 is connected directly the load.

Figure 15:
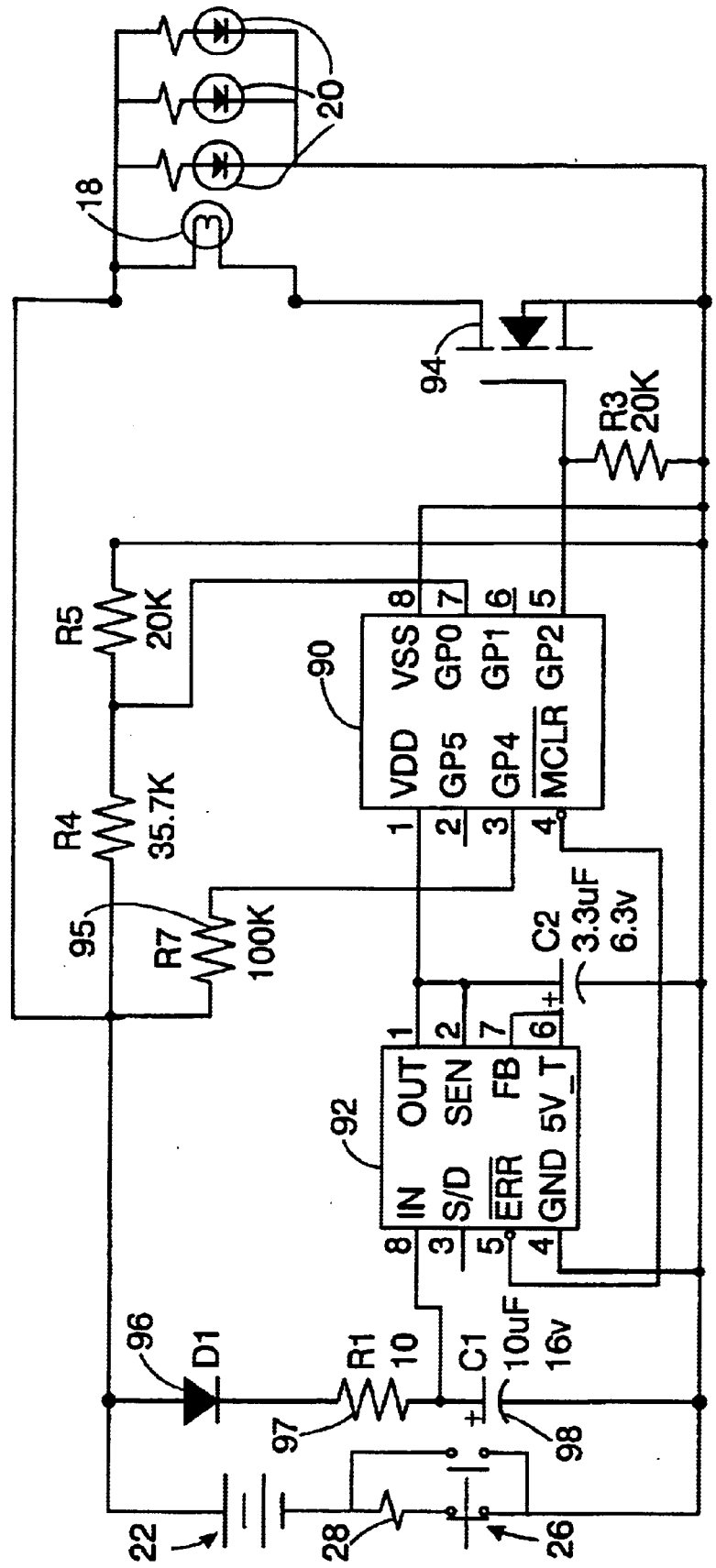
FIG. 15 is an example of a circuit diagram for the flashlight of FIGS. 1 and 2.
Figure 16:
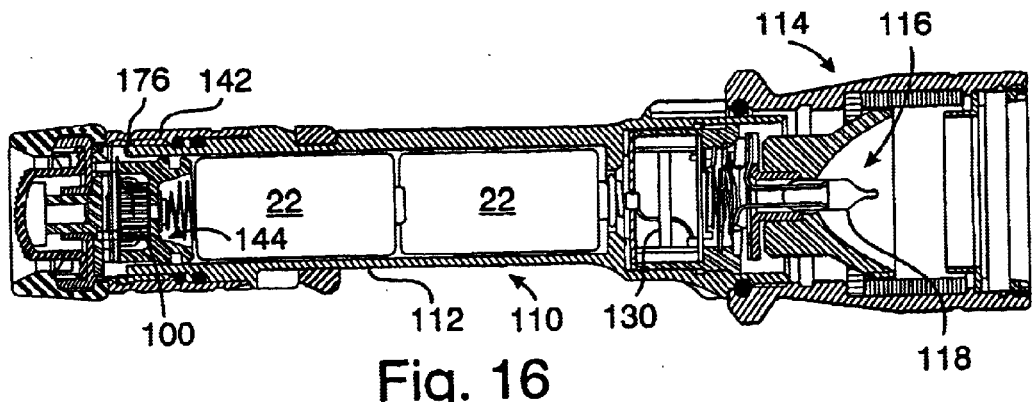
FIG. 16 is a side generally cross-sectional view of a second preferred embodiment of a flashlight apparatus according to the present invention.

FIG. 15 shows an example of a circuit for the controller 30 of FIG. 2 for the flashlight 10. This example includes a six-volt battery such as may be provided by two three-volt lithium battery cells 22, and the tail switch assembly resistor 28 is approximately ten ohms, the incandescent emitter 18 may comprise a conventional tungsten light bulb for producing a light output of approximately sixty lumens when powered by the two lithium cells 22, and the LEDs 20 may comprise three commonly available LEDs such as Nichia white LEDs for producing a light output of approximately five lumens when powered by the two lithium cells 22 (although other colored LEDs 20 may be utilized as well, including red, blue, green or infrared).

The controller 30 includes a microprocessor 90, such as a PIC12C671 manufactured by Microchip Technology Inc. (of Chandler, Ariz.), a low dropout voltage regulator 92 such as the LP2951 manufactured by National Semiconductor Corporation, and a power MOSFET 94 such as an IRF7401 FET manufactured by International Rectifier (of El Segundo, Calif.).

The microprocessor-based controller of FIG. 15 senses the presence of the tail cap assembly series resistor 28 by looking at the power source voltage drop when the tungsten light bulb 18 is connected. Three circuit design capabilities are utilized for permitting the microprocessor 90 to accomplish this task. First, the microprocessor 90 can turn on or off the tungsten light bulb 18 with the power FET 94 (connected to GPIO2) which is also used for maintaining regulated RMS voltage to the light bulb 18. Second, the microprocessor 90 can sense the power source voltage rapidly by a transistor-transistor logic (TTL) threshold input through resistor 95 (one hundred kilo-ohms in this example) connected to GPIO4. Third, the circuit provides the microprocessor 90 with its own stable power source during interruption in the main power, such as by a diode 96 (preferably a Schottky diode of, for example, one hundred milliamps), series resistor 97 (e.g., ten ohms) and capacitor 98 (e.g., ten microfarads) from the main source feeding the regulator 92.

Specifically, by the circuit of FIG. 15, the microprocessor 90 determines whether or not the tail cap assembly resistor 28 is present in the circuit, by utilizing the following procedure. The procedure starts by the microprocessor 90 connecting the tungsten light bulb 18 to the presented power source (the battery 22 and the switch assembly resistor 28). It does this by turning on the power FET 94 which connects the tungsten bulb 18 to the presented power source, and after a few microseconds the microprocessor 90 samples the power source voltage. If the ten-ohm resistor 28 is present, the power source voltage will drop to about one hundred fifty millivolts with a cold tungsten bulb, which is well below the logic low TTL level threshold (normally 0.8 volts) of the microprocessor input. If the bulb 18 is hot, then the power source drops to about 1.5 volts, which may not be immediately a TTL logic low; however, the bulb will cool in the next few milliseconds and the voltage will drop well below the TTL logic low threshold. If the power source voltage sags below a TTL logic low-level threshold, the microprocessor 90 turns off the power FET 94. In this way, the microprocessor 90 quickly detects that the ten-ohm resistor 28 is present with the procedure that takes only a few microseconds. The microprocessor 90 then waits for say four milliseconds and then repeats such procedure. If the tail switch resistor 28 is not present, then the sampled voltage is almost always above the TTL logic high threshold (normally 2.0 volts) with the tungsten light bulb hot or cold. The exception is when the battery is heavily drained, but typically such a battery will not light the tungsten bulb 18 so that this resistor detection system maintains the available power for the LEDs 20.

During the resistor detection system cycling when the power FET 94 is off, the available power source voltage drives the three LEDs 20 with about thirty-five milliamps of current in each LED 20 or about one hundred milliamps total. Since this procedure for detecting the series resistor 28 occurs about 0.6% of the time, the power loss associated with the detection procedure is about 3% additional as compared with not sampling at all. Further, the four-millisecond sample period allows the microprocessor 90 to respond quickly to the user's switching the tail cap switch 26 to its second ON position (i.e. shorting out the tail cap resistor 28) for effecting full brightness of the light emitter assembly (i.e., with both the tungsten light bulb 18 and the LEDs 20 being energized).

A second preferred flashlight embodiment 110 according to the present invention, is shown in FIGS. 16–20 wherein components having three-digit reference numerals (starting with 110) in which the first digit is a one (i.e., 100-series reference numerals) are similar to components shown in FIGS. 1–15 having two-digit reference numerals corresponding to the second and third digits of such 100-series reference numerals.

The flashlight 110 includes a single incandescent lamp 118 in the light emitter assembly 116, preferably a tungsten light bulb 118, with two user-selectable brightness levels powered by a six-volt battery such as the two three-volt lithium battery cells 22. Examples of such tungsten light bulbs 118 are well known and readily available, including such bulbs for producing—when used in the flashlight 110 of the present invention—one hundred lumens in its bright setting and twenty lumens in its dim setting, or sixty lumens in its bright setting and twelve lumens in its dim setting, or twenty-five lumens in its bright setting and five lumens in its dim setting.

The tail cap assembly 124 includes a switch assembly 126 similar to the tail cap and switch assemblies 24, 26 of the flashlight 10 shown in FIGS. 1–14, except that the electrical component which may be placed alternatively in circuit and out of circuit with the battery 22 by the user's selective operation of the switch assembly 126 is implemented by an inductor 100 rather than by the resistor 28. An example of such an inductor is provided by a copper wire-wound magnetic toroidal core, such as a Magnetecs #0J41003-TC magnetic core wound with twenty turns of 24 AWG wire.

Figure 18:
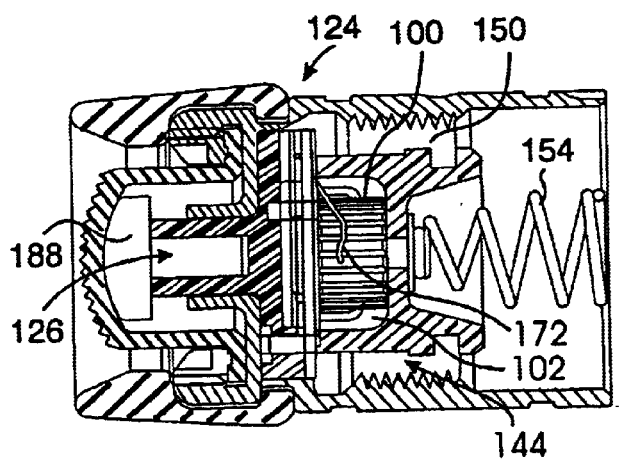
FIG. 18 is a side generally cross-sectional view of a tail cap switch assembly of the flashlight of FIG. 16, shown in increased scale for ease of description.
Figure 19:
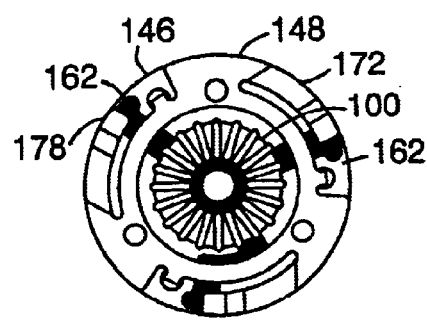
FIG. 19 is a front view of the circuit board/contact washer combination included in the tail cap assembly of FIG. 18.

The circuit board assembly 144 of the flashlight 110 is similar to the circuit board assembly 44 shown in FIGS. 3–9, except that the tail cap assembly inductor 100 replaces the tail cap assembly resistor 28. Because of its size, the inductor 100 is more conveniently situated on the circuit board's front face 162 rather than on the circuit board's rear face, the toroidal inductor 100 being physically contained within a compartment 102 of the spring retainer 150 (FIG. 18).

The tail cap and switch assemblies 124, 126 of the flashlight 110, and their operation, are as shown in FIGS. 10–14 and described above in connection with the flashlight 10, for effecting the OFF, first ON and second ON positions of the tail cap switch 126. When the switch assembly 126 is in its OFF position (as shown in FIG. 10), there is no power to the controller 130 and to the bulb 118. During the first ON position (as shown in FIG. 11 or FIG. 13), the contact engagement between the flexible arms 172 of the contact washer 148 and the rear edge 176 of the conductive battery housing 112 completes the circuit of FIG. 17 with the inductor 100 in series circuit between the battery 22 and the load (controller 130 and tungsten bulb 118). When the switch 126 is in its second ON position (as shown in FIG. 12 or FIG. 14), the inductor 100 is shorted out of the circuit, and the battery 22 is connected directly to the load.

Figure 17:
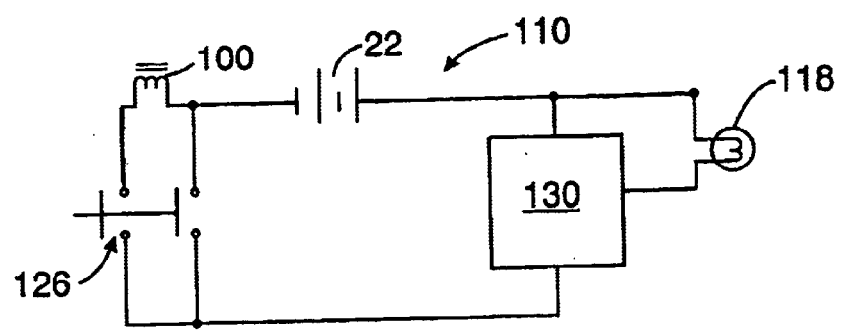
FIG. 17 is a schematic diagram of the flashlight of FIG. 16.
Figure 20:
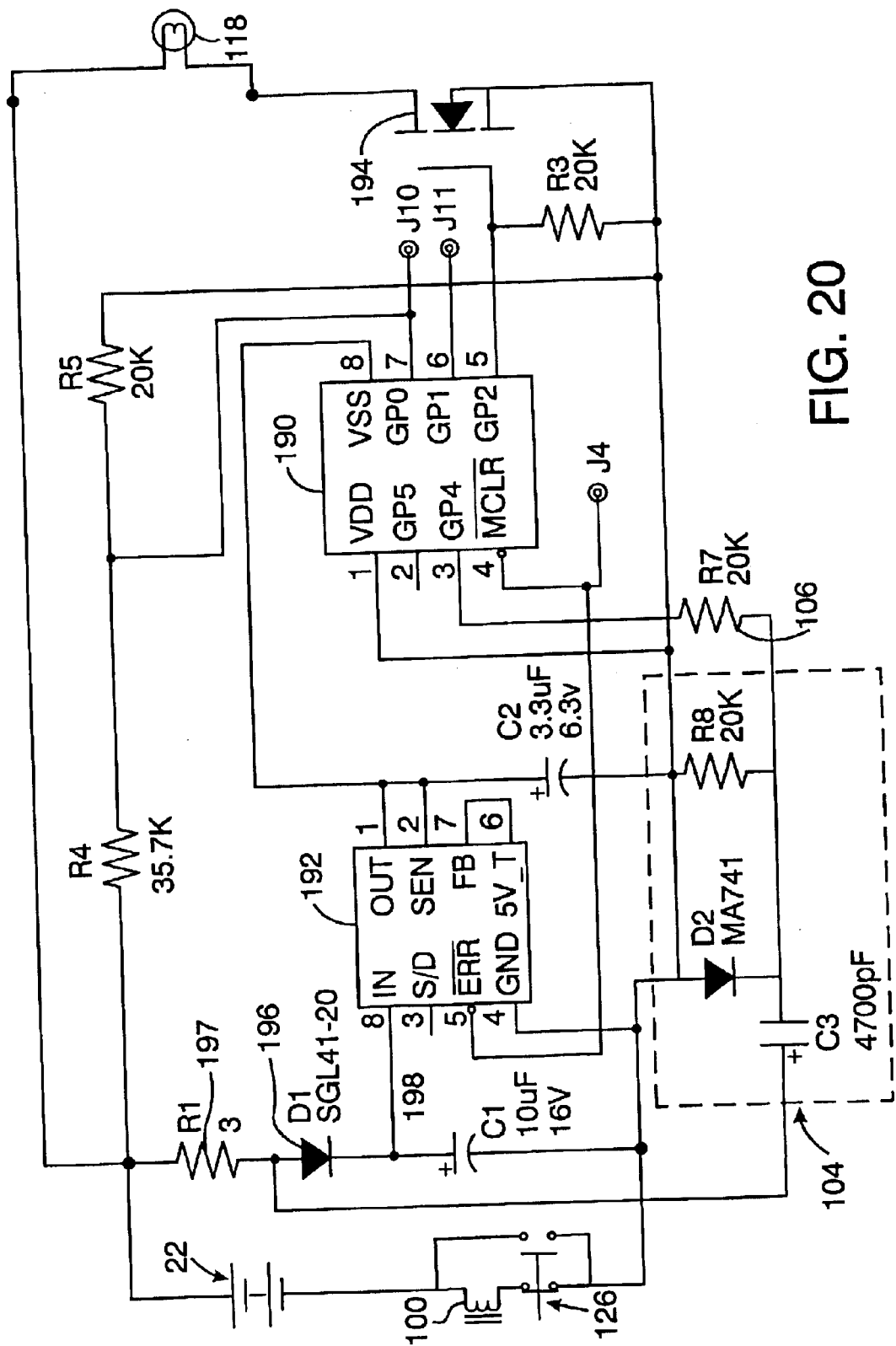
FIG. 20 is an example of a circuit diagram for the flashlight of FIGS. 16 and 17.

FIG. 20 shows an example of a circuit for the controller 130 of FIG. 17 for the flashlight 110. The controller 130 includes a microprocessor 190 similar to the microprocessor 90, a low drop out voltage regulator 192 similar to the voltage regulator 92, and a power MOSFET 194 such as an IRF3803 FET (manufactured by International Rectifier).

The microprocessor-based controller of FIG. 20 senses the presence of the switch assembly series inductor 100 by looking at the power source voltage drop spike when the tungsten light bulb 118 is connected. Three circuit design capabilities are utilized for permitting the microprocessor 190 to accomplish this task. First, the microprocessor 190 can turn on or off the tungsten light bulb 118 with the power FET 194 (connected to GPIO2) which is also used for maintaining regulated RMS voltage to the light bulb 118. Second, the microprocessor 190 can sense saturation of the inductor 100 by an inductor saturation detection circuit 104 connected through a twenty kilo-ohm resistor 106 to a TTL threshold input (GPIO4). Third, the circuit provides the microprocessor 190 with its own stable power source during interruption in the main power, such as by a diode 196 (preferably a Schottky diode of, for example, one amp), series resistor 197 (e.g., three ohms) and capacitor 198 (e.g., ten microfarads) from the main source feeding the regulator 192.

Specifically, by the circuit of FIG. 20, the microprocessor 190 determines whether or not the tail cap assembly inductor 100 is present in the circuit, by utilizing the following procedure. The procedure starts by the microprocessor 190 connecting the tungsten light bulb 118 to the presented power source (the battery 22 and the tail cap assembly inductor 100). It does this by turning on the power FET 194 which connects the tungsten bulb 118 to the presented power source, and after a few microseconds the microprocessor 190 samples the induction saturation detection circuit 104. If the inductor 100 is present, the sampled voltage normally will be well above the TTL logic high threshold, and the microprocessor 190 will provide the low power setting to the bulb 118. If the inductor 100 is not present, the sampled voltage will always be well below the TTL logic low threshold, and the microprocessor 190 will provide the high power setting to the bulb 118.

The use of a saturating series inductor 100 in the switch assembly 126 achieves very high power efficiency because the loss is mostly resistance of the inductor's copper wire, since the inductive reactance happens for about four microseconds every four milliseconds. The copper wire resistance is only 22 milliohms, being only twenty turns of 24 AWG wire on a high permeability ferrite toroidal core measuring 0.37-inch diameter by 0.125 inch squared in cross section. Such resistance causes less than 2% power loss with the one hundred lumen bulb 118, and much less with bulbs of lesser light output.

Figure 21:
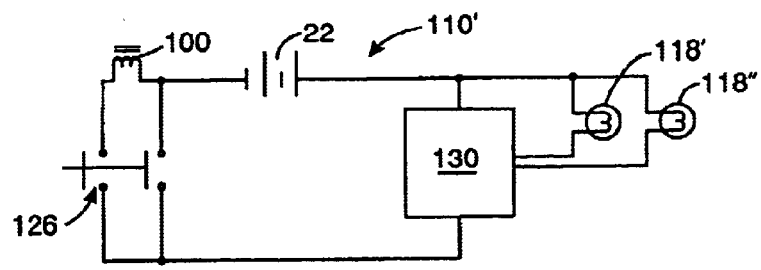
FIG. 21 is a schematic diagram of a third preferred embodiment of a flashlight apparatus according to the present invention.

A third preferred flashlight 110' embodiment according to the present invention, represented in FIG. 21, includes two incandescent light bulbs 118' and 118" with two user-selectable brightness levels. This flashlight embodiment works much the same as the single tungsten bulb 118 flashlight 110, but instead of dimming one bulb for low light output, a low light output bulb 118' is switched on and run at full power when the tail switch is in one of its ON positions, preferably the first ON position. When the tail switch is in the other (preferably second) ON position, a high light output bulb 118" is switched on. In such other (second) ON position, the low output bulb 118' may be switched off, or it may remain on along with the high output bulb 118".

Figure 22:
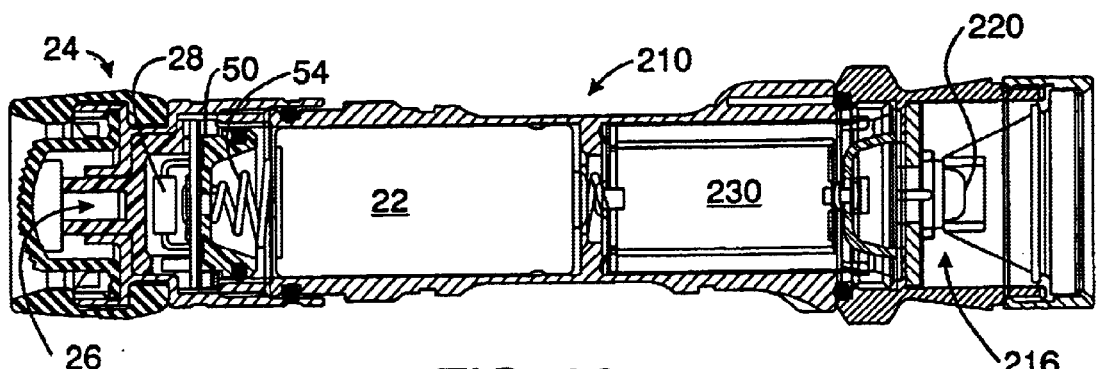
FIG. 22 is a side generally cross-sectional view of a fourth preferred embodiment of a flashlight apparatus according to the present invention.
Figure 23:
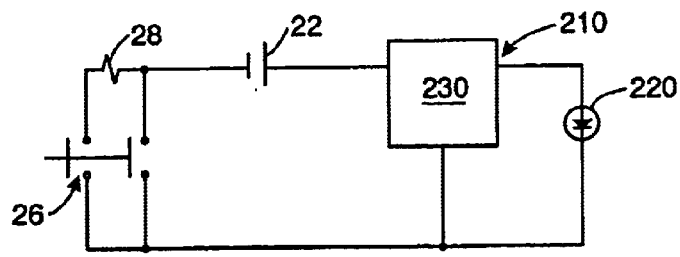
FIG. 23 is a schematic diagram of the flashlight of FIG. 22.
Figure 24:
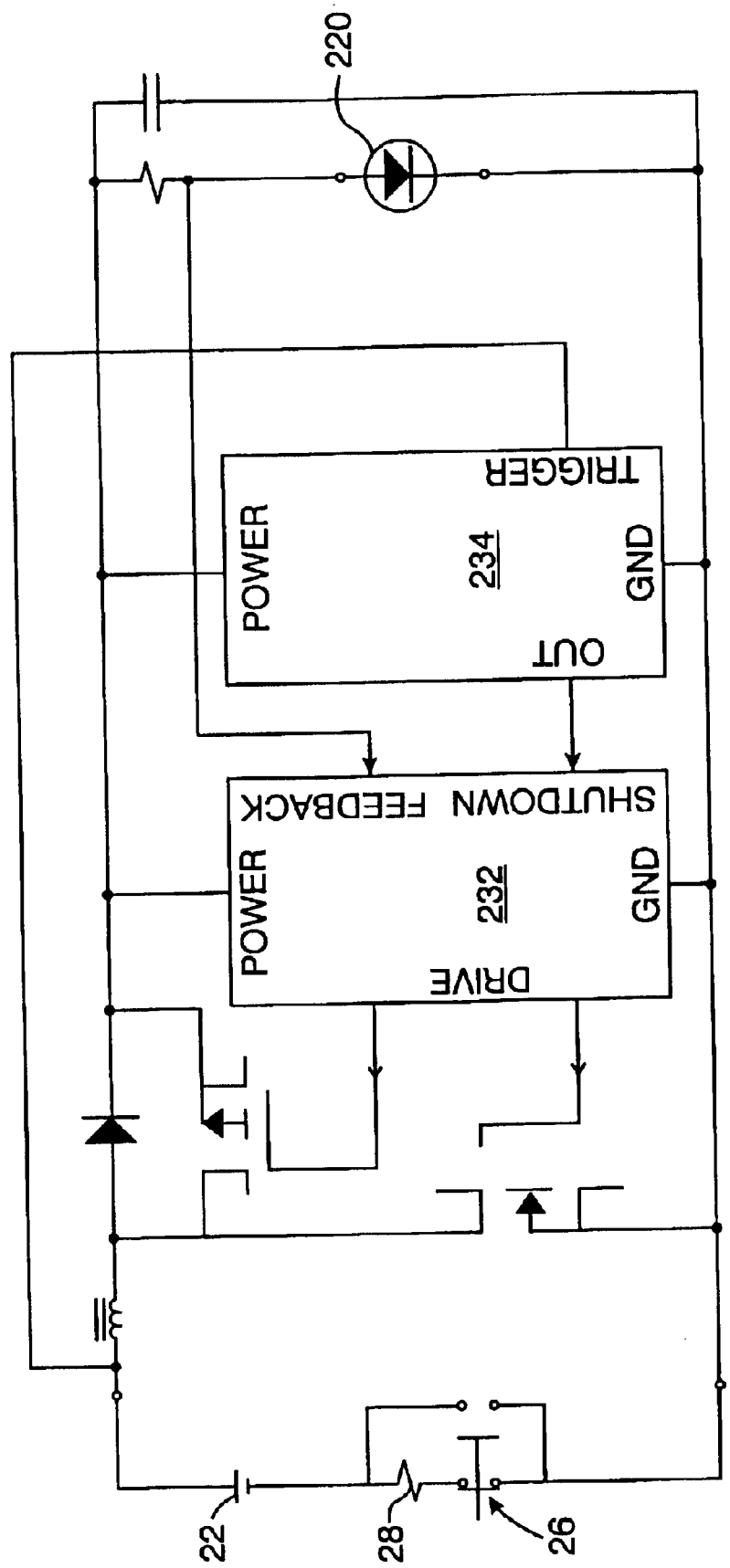
FIG. 24 is an example of a circuit diagram for the flashlight of FIGS. 22 and 23.

A fourth preferred flashlight embodiment 210 according to the present invention is shown in FIGS. 22–24, for selectively producing two brightness levels from a single LED. The flashlight 210 utilizes a high luminous flux LED 220 in the light emitter assembly 216, such as a one-watt LED manufactured by Lumileds Lighting, LLC (of San Jose, Calif.) and marketed under the trademark LUXEON including such LEDs marketed under the LUXEON STAR trademark.

The flashlight 210, in the embodiment shown, is powered by a three-volt battery 22 such as a single three-volt lithium battery cell, and includes tail cap and switch assemblies 24, 26 similar to the tail cap and switch-assemblies 24, 26 of the flashlight 10 shown in FIGS. 1–14, including the tail cap resistor 28, for effecting the OFF, first ON and second ON positions of the tail cap switch 26.

In connection with the flashlight 210, there is no power to the controller 230 and to the LED 220 when the switch assembly 26 is in its OFF position (as shown in FIG. 10). During the first ON position (as shown in FIGS. 11 or 13), the contact engagement between the flexible arms 72 of the contact washer 48 and the rear edge 76 of the conductive battery housing 12 completes the circuit of FIG. 23 with the resistor 28 in series circuit between the battery 22 and the load (controller 230 and LED 220). When the switch 26 is in its second ON position (as shown in FIG. 12 or FIG. 14), the resistor 28 is shorted out of the circuit, and the battery 22 is connected directly to the load.

FIG. 24 shows an example of a circuit for the controller 230 of FIG. 23 for the flashlight 210. The controller 230 includes a synchronous DC to DC boost converter 232 with output current feedback to regulate LED high power brightness when it is connected directly to the three-volt battery 22, i.e. when the tail cap switch ten-ohm resistor 28 is shorted out of the circuit during the time that the tail cap switch assembly 26 is in its second ON position.

When the tail cap switch ten-ohm series resistor 28 is present in the circuit (i.e. when the switch 26 is in its first ON position), the input voltage rapidly drops to near zero volts when the DC to DC converter 232 tries to boost the input voltage to the required output voltage and current. The controller's detector circuit and one-shot 234, shown in FIG. 24, cause the DC to DC converter 232 to shut down for about ten milliseconds. In the shutdown state, the converter input is effectively connected to the output, allowing the LED 220 to be dimly lit. A preferred embodiment of this circuit matches the forward voltage of the LED 220 to the voltage of the lithium battery cell 22 at this low power level, less the drop in the tail cap ten-ohm resistor 28. Utilizing a one-watt LUXEON STAR LED 220, a three-volt lithium battery cell 22, and a ten-ohm tail cap resistor 28, the flashlight 210 would produce a light output of approximately one lumen when the tail cap switch 26 is in its first ON position and a light output of approximately ten lumens when the tail cap switch 26 is in its second ON position.

Figure 25:
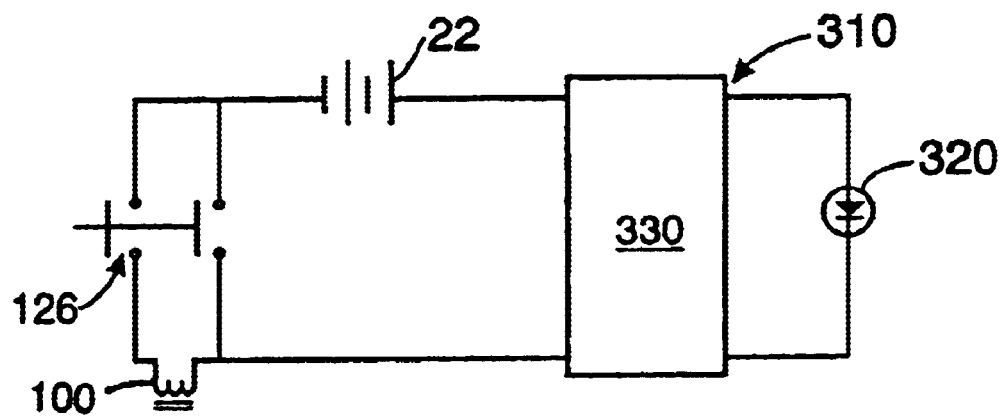
FIG. 25 is a schematic diagram of a fifth preferred embodiment of a flashlight apparatus according to the present invention.
Figure 26:
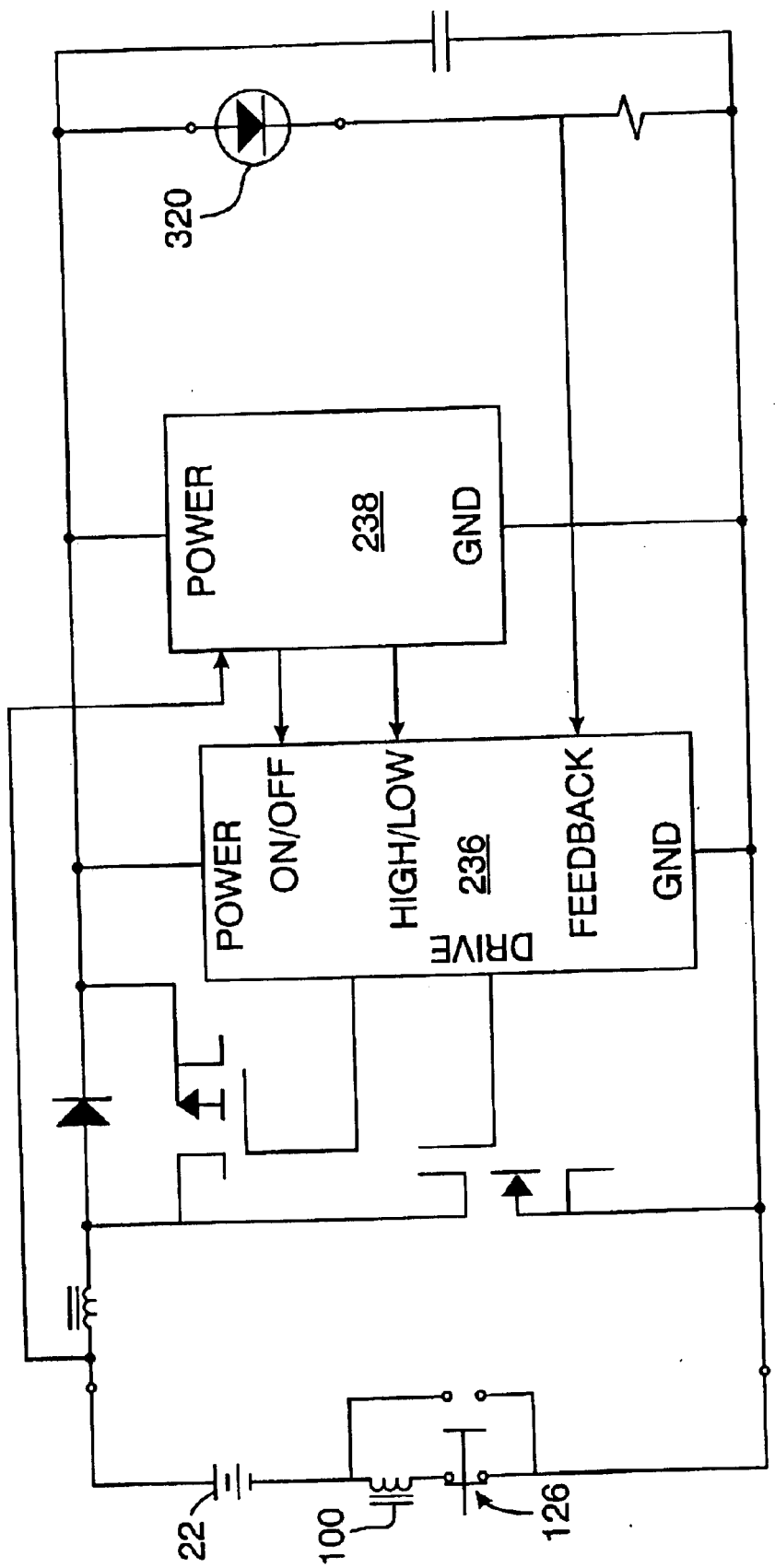
FIG. 26 is an example of a circuit diagram for the flashlight of FIG. 25.

A fifth preferred flashlight embodiment 310 according to the present invention, represented in FIGS. 25 and 26, also selectively produces two brightness levels from a single LED. The flashlight 310 utilizes an even higher luminous flux LED 320 in the light emitter assembly, such as a five-watt LED manufactured by Lumileds Lighting, LLC and marketed under the trademark LUXEON including such LEDs marketed under the LUXEON V STAR trademark. Except for the LED 320 instead of the tungsten bulb 118, and as otherwise discussed below, the flashlight 310 is similar to the flashlight 110 of FIG. 16.

The flashlight 310 is powered by a six-volt battery 22 such as two three-volt lithium battery cells, and includes tail cap and switch assemblies 124, 126 similar to the tail cap and switch assemblies 124, 126 of the flashlight 110 shown in FIGS. 16–19, including the tail cap switch series inductor 100, for effecting the OFF, first ON and second ON positions of the tail cap switch 126.

In connection with the flashlight 310, there is no power to the controller 330 and to the LED 320 when the switch assembly 126 is in its OFF position (as shown in FIG. 10). During the first ON position (as shown in FIGS. 11 or 13), the circuit of FIG. 25 is completed with the inductor 100 in series circuit between the batter 22 and the load (controller 330 and LED 320). When the tail cap switch 126 is in its second ON position (as shown in FIG. 12 or FIG. 14), the inductor 100 is shorted out of the circuit, and the battery 22 is connected directly to the load.

FIG. 26 shows an example of a circuit for the controller 330 of FIG. 25 for the flashlight 310. The controller 330 includes a synchronous DC to DC boost converter 236 with output current feedback to regulate LED high power brightness when it is connected directly to the six-volt battery 22, i.e. when the tail cap switch inductor 100 is shorted out of the circuit during the time that the tail cap switch assembly 126 is in its second ON position.

When the tail cap series inductor 100 is present in the circuit (i.e. when the switch 126 is in its first ON position), the controller 330 reduces the LED power to the low brightness level. The controller 330 periodically senses for presence of the inductor 100 in similar manner as the controller 130 of the flashlight 110. As shown in FIG. 26, a microprocessor 238 first turns off the DC to DC converter 236 thereby allowing the tail cap inductor 100 to come out of saturation, then test loads the input to detect the inductor 100, and finally returns the DC to DC converter 236 to the high or low power level depending on whether or not the inductor 100 was detected.

Utilizing a five-watt LUXEON V STAR LED 320, a six-volt battery 22 comprising two three-volt lithium cells, and an inductor 100 as previously described in connection with the flashlight 110, the flashlight 310 would produce a light output of approximately ten lumens when the tail cap switch 126 is in its first ON position and a light output of approximately sixty lumens when the tail cap switch 126 is in its second ON position.

In the above-described flashlights, the controller regulates the power to the light emitters for providing light output of constant brightness with decreasing battery voltage over time. For tungsten light bulbs, pulse width modulation is used to maintain a constant DC coupled true RMS voltage. Regulating the voltage to light bulbs by pulse width modulation is described in the publication "Pulse Width Modulated Voltage Regulator for Electric Caving Lamps" by William A. Hunt, one of the present inventors, which publication is dated Sep. 22, 1993, revised in 1994 and 1995, and is available on the Internet at www.cs.indiana.edu/~willie, such publication being incorporated herein by reference; and in U.S. Pat. No. 4,499,525 to Henry R. Mallory, the disclosure of which patent is incorporated herein by reference.

Figure 27:
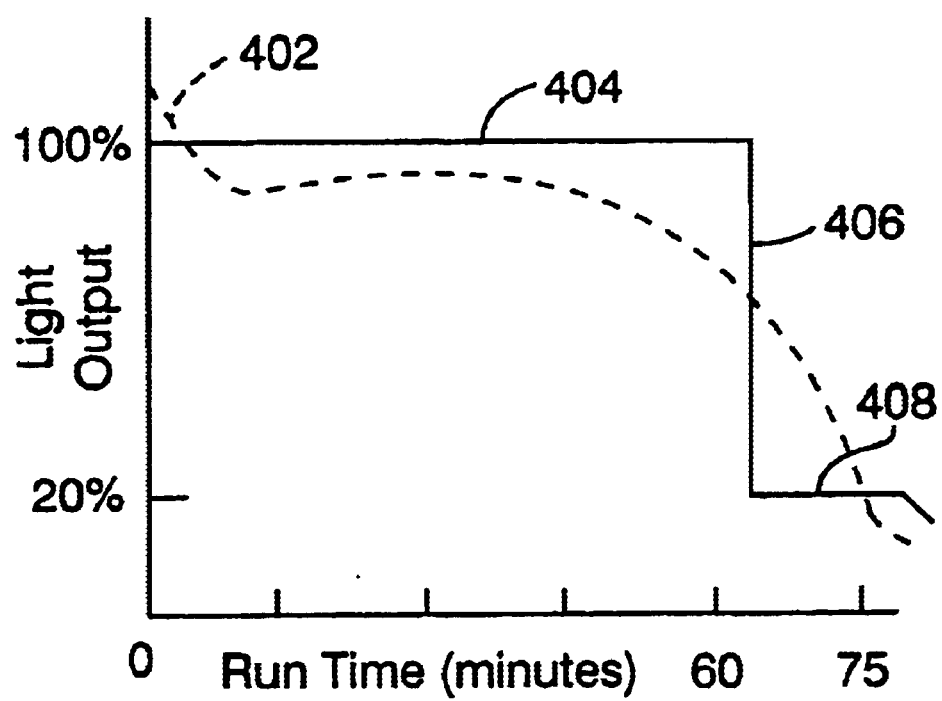
FIG. 27 is a graphical representation of an abrupt usable light output reduction feature of the present invention upon approaching battery exhaustion.

Using pulse width modulation for maintaining regulated RMS voltage to the light bulb, during each of the previously described sampling cycles when the flashlight's controller samples the battery voltage while the light bulb is connected, the controller calculates the correct duty cycle for the pulse width modulation (square of bulb voltage divided by square of input voltage) and generates that duty during the next cycle. In FIG. 27, the dashed line 402 represents a typical curve of light output versus run time without maintaining regulated voltage to the light bulb, using a tungsten light bulb and lithium battery combination wherein the battery would approach exhaustion in say sixty minutes. The light output as a function of time for the regulated voltage to the bulb is shown by the solid line 404 showing the regulated light output maintained at a constant level. At a programmed battery voltage set point which is near 100% duty cycle and also near battery exhaustion corresponding to say sixty minutes of run time, the controller abruptly reduces the bulb voltage to say 70% which abruptly and significantly reduces the light output to about 20% (shown by the solid line 406), giving the user a clear indication that the battery is approaching exhaustion. The controller preferably then maintains a constant lower bulb voltage for maintaining a constant brightness at the 20% light output level for a further time period, after which the light bulb may dim as the controller further reduces the bulb voltage while maintaining sufficient voltage for the controller to continue to properly function. This extends the running time beyond that which would occur if the bulb were directly connected to the battery since, in such latter case, the nearly exhausted battery would not be able to directly support the high current draw of the bulb. After the abrupt programmed dropdown as shown in FIG. 27, the decreased light output (solid line 408) is preferably sufficient for providing the lowered constant light output for another say fifteen minutes, which light level is sufficient for permitting navigation as well as for permitting the user to retrieve fresh battery cells for replacing the exhausted cells in the flashlight.

For the LEDs, the controller maintains a constant current through the LED since forward current closely tracks light output and since an LED's forward voltage drop is poorly correlated with power input and varies with temperature. When the battery nears exhaustion, the controller dims the LED, giving the user an indication that the battery is nearing exhaustion. Since an LED's luminous efficiency increases with power decrease, the LED flashlights described above continue to give usable light even though the LED power drops by a large factor, providing the LED with a long run time of decreasing yet useful light output.

Thus, there have been described preferred embodiments of flashlights with user-selectable actuation, preferably through a pushbutton tail switch, of different brightness levels of the light emitter assembly's light output. Other embodiments of the present invention, and variations of the embodiment described herein, may be developed without departing from the essential characteristics thereof. Accordingly, the invention should be limited only by the scope of the claims listed below.

We claim:

1. In a flashlight, the combination comprising:
   a battery;
   a switch having an OFF position not connected to said battery, a first ON position connected to said battery, and a second ON position connected to said battery;
   an electrical component in circuit with said battery when said switch is in said first ON position and not in circuit with said battery when said switch is in said second ON position;
   a light emitter assembly; and
   a controller in circuit with said battery, said switch and said light emitter assembly, for detecting whether or not said electrical component is in circuit with said battery when said switch is in either one of said first ON position and said second ON position, and for controlling electrical power to said light emitter assembly for producing a first light output when said electrical component is detected and for producing a second light output when said electrical component is not detected.

2. The flashlight according to claim 1, wherein:
   said controller regulates power to said light emitter assembly for providing constant brightness of at least one of said first light output and said second light output.

3. The flashlight according to claim 2, wherein:
   said controller abruptly reduces power to said light emitter assembly when said battery is near exhaustion, for abruptly reducing light output of said light emitter assembly.

4. The flashlight according to claim 1, including:
   a switch actuator for placing said switch alternatively in said OFF position, said first ON position and said second ON position.

5. The flashlight according to claim 1, wherein:
   a pushbutton coupled to said switch, said pushbutton depressible by a first distance placing said switch in said first ON position and depressible by a second distance placing said switch in said second ON position.

6. The flashlight according to claim 1, wherein:
   said electrical component comprises a resistor.

7. The flashlight according to claim 6, wherein:
   said resistor is in circuit with said battery when said switch is in said first ON position and is shorted out of said circuit when said switch is in said second ON position.

8. The flashlight according to claim 1, wherein:
   said electrical component comprises an inductor.

9. The flashlight according to claim 8, wherein:
   said inductor is in circuit with said battery when said switch is in said first ON position, and said inductor is shorted out of said circuit when said switch is in said second ON position.

10. The flashlight according to claim 1, wherein:
    said light emitter assembly includes an incandescent lamp connected to said controller and at least one light emitting diode connected to said battery through said switch, said at least one light emitting diode being powered by said battery for producing light output when said switch is in said first ON position, said controller delivering power to said incandescent lamp for producing light output when said switch is in said second ON position but not when said switch is in said first ON position.

11. The flashlight according to claim 10, wherein:
    said at least one light emitting diode is powered by said battery for producing light output when said switch is in said second ON position.

12. The flashlight according to claim 10, including:
    a switch actuator coupled to said switch and translatable by a first distance placing said switch in said first ON position and translatable by a second distance placing said switch in said second ON position.

13. The flashlight according to claim 12, wherein:
said switch actuator includes a pushbutton depressible by said first distance placing said switch in said first ON position and depressible by said second distance placing said switch in said second position.

14. The flashlight according to claim 10, wherein:
said controller regulates power to said incandescent lamp for providing constant brightness of the light output of said incandescent lamp when said switch is in said second ON position.

15. The flashlight according to claim 14, wherein:
said controller abruptly reduces power to said incandescent lamp when said battery is near exhaustion, for abruptly reducing light output of said light emitter assembly.

16. The flashlight according to claim 10, wherein:
said electrical component comprises a resistor.

17. The flashlight according to claim 16, wherein:
said resistor is in circuit with said battery when said switch is in said first ON position, and said resistor is shorted out of said circuit when said switch is in said second ON position.

18. The flashlight according to claim 1, wherein:
said light emitter assembly includes an incandescent lamp connected to said controller, said controller delivering power to said incandescent lamp for producing said first light output when said switch is in said first ON position and for producing said second light output when said switch is in said second ON position.

19. The flashlight according to claim 18, including:
a switch actuator coupled to said switch and translatable by a first distance placing said switch in said first ON position and translatable by a second distance placing said switch in said second ON position.

20. The flashlight according to claim 19, wherein:
said switch actuator includes a pushbutton depressible by said first distance placing said switch in said first ON position and depressible by said second distance placing said switch in said second position.

21. The flashlight according to claim 18, wherein:
said controller regulates power to said incandescent lamp for providing constant brightness of said first light output and constant brightness of said second light output.

22. The flashlight according to claim 21, wherein:
said controller abruptly reduces power to said incandescent lamp when said battery is near exhaustion, for abruptly reducing light output of said incandescent lamp.

23. The flashlight according to claim 18, wherein:
said second light output is brighter than said first light output.

24. The flashlight according to claim 18, wherein:
said electrical component comprises an inductor.

25. The flashlight according to claim 24, wherein:
said inductor is in circuit with said battery when said switch is in said first ON position, and said resistor is shorted out of said circuit when said switch is in said second ON position.

26. The flashlight according to claim 1, wherein:
said light emitter assembly includes two incandescent lamps connected to said controller, said controller delivering power to one of said incandescent lamps for producing light output when said switch is in said first ON position, said controller delivering power to the other of said incandescent lamps for producing light output when said switch is in said second ON position.

27. The flashlight according to claim 26, including:
a switch actuator coupled to said switch and translatable by a first distance placing said switch in said first ON position and translatable by a second distance placing said switch in said second ON position.

28. The flashlight according to claim 27, wherein:
said switch actuator includes a pushbutton depressible by said first distance placing said switch in said first ON position and depressible by said second distance placing said switch in said second position.

29. The flashlight according to claim 26, wherein:
said controller regulates power to said incandescent lamps for providing constant brightness of the light output of said one of said incandescent lamps and for providing constant brightness of the light output of said other of said incandescent lamps.

30. The flashlight according to claim 29, wherein:
said controller abruptly reduces power to said incandescent lamps when said battery is near exhaustion, for abruptly reducing light output of said incandescent lamps.

31. The flashlight according to claim 26, wherein:
said electrical component comprises an inductor.

32. The flashlight according to claim 31, wherein:
said inductor is in circuit with said battery when said switch is in said first ON position, and said inductor is shorted out of said circuit when said switch is in said second ON position.

33. The flashlight according to claim 1, wherein:
said light emitter assembly includes two incandescent lamps connected to said controller, said controller delivering power to one of said incandescent lamps for producing said first light output when said switch is in said first ON position, said controller delivering power to both of said incandescent lamps for producing said second light output when said switch is in said second ON position.

34. The flashlight according to claim 33, including:
a switch actuator coupled to said switch and translatable by a first distance placing said switch in said first ON position and translatable by a second distance placing said switch in said second ON position.

35. The flashlight according to claim 34, wherein:
said switch actuator includes a pushbutton depressible by said first distance placing said switch in said first ON position and depressible by said second distance placing said switch in said second position.

36. The flashlight according to claim 33, wherein:
said controller regulates power to said incandescent lamps for providing constant brightness of said first light output and for providing constant brightness of said second light output.

37. The flashlight according to claim 36, wherein:
said controller abruptly reduces power to said incandescent lamps when said battery is near exhaustion, for abruptly reducing light output of said incandescent lamps.

38. The flashlight according to claim 33, wherein:
said electrical component comprises an inductor.

39. The flashlight according to claim 38, wherein:
said inductor is in circuit with said battery when said switch is in said first ON position, and said inductor is shorted out of said circuit when said switch is in said second ON position.

40. The flashlight according to claim 1, wherein:

said light emitter assembly includes a light emitting diode connected to said controller, said controller controlling power to said light emitting diode for producing said first light output when said switch is in said first ON position and for producing said second light output when said switch is in said second ON position.

41. The flashlight according to claim 40, wherein:

said second light output is brighter than said first light output.

42. The flashlight according to claim 40, including:

a switch actuator coupled to said switch and translatable by a first distance placing said switch in said first ON position and translatable by a second distance placing said switch in said second ON position.

43. The flashlight according to claim 42, wherein:

said switch actuator includes a pushbutton depressible by said first distance placing said switch in said first ON position and depressible by said second distance placing said switch in said second position.

44. The flashlight according to claim 40, wherein:

said controller regulates power to said light emitting diode for providing constant brightness of said first light output and for providing constant brightness of said second light output.

45. The flashlight according to claim 44, wherein:

said controller abruptly reduces power to said light emitting diode when said battery is near exhaustion, for abruptly reducing light output of said light emitting diode.

46. The flashlight according to claim 40, wherein:

said electrical component comprises a resistor.

47. The flashlight according to claim 46, wherein:

said battery is of approximately three volts.

48. The flashlight according to claim 47, wherein:

said resistor is in circuit with said battery when said switch is in said first ON position, and said resistor is shorted out of said circuit when said switch is in said second ON position.

49. The flashlight according to claim 40, wherein:

said electrical component comprises an inductor.

50. The flashlight according to claim 49 wherein:

said inductor is in circuit with said battery when said switch is in said first ON position, and said inductor is shorted out of said circuit when said switch is in said second ON position.

51. The flashlight according to claim 49, wherein:

said battery is of approximately six volts.

52. The flashlight according to claim 1, including:

a battery housing for said battery, said battery housing having a rear end and a front end, said light emitter assembly situated at said front end; and a tail cap assembly coupled to said battery housing at said rear end, said tail cap assembly including said switch and said electrical component.

53. The flashlight according to claim 52, wherein:

said tail cap assembly includes a pushbutton depressible by a first distance placing said switch in said first ON position and depressible by a second distance placing said switch in said second ON position.

54. The flashlight according to claim 52, wherein:

said controller electrically communicates with said switch and said electrical component along said battery housing.

55. The flashlight according to claim 54, wherein:

said rear end of said battery housing includes an electrically conductive rear edge; and said switch includes a contact member coupled through said electrical component to a terminal of said battery in said battery housing, said contact member including at least one resilient arm spaced from said conductive rear edge of said battery housing when said switch is in said OFF position, said at least one resilient arm in conductive contact with said conductive rear edge when said switch is in said first ON position, said at least one resilient arm in conductive contact with said conductive rear edge and with said terminal of said battery shorting out said electrical component when said switch is in said second ON position.

56. The flashlight according to claim 55, wherein:

said tail cap assembly includes a switch actuator for placing said at least one resilient arm of said contact member in conductive contact with said conductive rear edge of said battery housing, and for placing said at least one resilient arm in conductive contact with said conductive rear edge and with said terminal of said battery shorting out said electrical component.

57. The flashlight according to claim 56, wherein:

said switch actuator is provided by said tail cap assembly threadedly rotatable along said rear end of said battery housing for translating said tail cap assembly a first distance placing said at least one resilient arm of said contact member in conductive contact with said rear conductive edge of said battery housing, and for translating said tail cap assembly a second distance placing said at least one resilient arm in conductive contact with said rear edge and with said terminal of said battery shorting out said electrical component.

58. The flashlight according to claim 56, wherein:

said switch actuator is provided by a pushbutton included in said tail cap assembly, said pushbutton depressible by a first distance for urging said at least one resilient arm of said contact member in conductive contact with said conductive rear edge of said battery housing, said pushbutton depressible by a second distance for urging said at least one resilient arm in conductive contact with said conductive rear edge and with said terminal of said battery shorting out said electrical component.

59. The flashlight according to claim 56, wherein:

said controller regulates power to said light emitter assembly for providing constant brightness of at least one of said first light output and said second light output.

60. The flashlight according to claim 59, wherein:

said controller abruptly reduces power to said light emitter assembly when said battery is near exhaustion, for abruptly reducing light output of said light emitter assembly.

61. The flashlight according to claim 56, wherein:

said electrical component comprises a resistor.

62. The flashlight according to claim 56, wherein:

said electrical component comprises an inductor.

63. The flashlight according to claim 56, wherein:

said light emitter assembly includes an incandescent lamp connected to said controller and at least one light emitting diode connected to said battery through said switch, said at least one light emitting diode being powered by said battery for producing light output when said switch is in either one of said first ON position and said second ON position, said controller delivering power to said incandescent lamp for producing light output when said switch is in said second ON position but not when said switch is in said first ON position.

64. The flashlight according to claim 63, wherein:
said controller regulates power to said incandescent lamp when said switch is in said second ON position.

65. The flashlight according to claim 64, wherein:
said controller abruptly reduces power to said incandescent lamp when said battery is near exhaustion, for abruptly reducing light output of said light emitter assembly.

66. The flashlight according to claim 63, wherein:
said electrical component comprises a resistor.

67. The flashlight according to claim 56, wherein:
said light emitter assembly includes an incandescent lamp connected to said controller, said controller delivering power to said incandescent lamp for producing said first light output when said switch is in said first ON position and for producing said second light output when said switch is in said second ON position.

68. The flashlight according to claim 67, wherein:
said controller regulates power to said incandescent lamp for providing constant brightness of said first light output and constant brightness of said second light output.

69. The flashlight according to claim 68, wherein:
said controller abruptly reduces power to said incandescent lamp when said battery is near exhaustion, for abruptly reducing light output of said incandescent lamp.

70. The flashlight according to claim 67, wherein:
said second light output is brighter than said first light output.

71. The flashlight according to claim 67, wherein:
said electrical component comprises an inductor.

72. The flashlight according to claim 56, wherein:
said light emitter assembly includes two incandescent lamps connected to said controller, said controller delivering power to one of said incandescent lamps for producing light output when said switch is in said first ON position, said controller delivering power to the other of said incandescent lamps for producing light output when said switch is in said second ON position.

73. The flashlight according to claim 72, wherein:
said controller regulates power to said incandescent lamps for providing constant brightness of the light output of said one of said incandescent lamps and for providing constant brightness of the light output of said other of said incandescent lamps.

74. The flashlight according to claim 73, wherein:
said controller abruptly reduces power to said incandescent lamps when said battery is near exhaustion, for abruptly reducing light output of said incandescent lamps.

75. The flashlight according to claim 72, wherein:
said electrical component comprises an inductor.

76. The flashlight according to claim 56, wherein:
said light emitter assembly includes two incandescent lamps connected to said controller, said controller delivering power to one of said incandescent lamps for producing said first light output when said switch is in said first ON position, said controller delivering power to both of said incandescent lamps for producing said second light output when said switch is in said second ON position.

77. The flashlight according to claim 76, wherein:
said controller regulates power to said incandescent lamps for providing constant brightness of said first light output and for providing constant brightness of said second light output.

78. The flashlight according to claim 77, wherein:
said controller abruptly reduces power to said incandescent lamps when said battery is near exhaustion, for abruptly reducing light output of said incandescent lamps.

79. The flashlight according to claim 76, wherein:
said electrical component comprises an inductor.

80. The flashlight according to claim 56, wherein:
said light emitter assembly includes a light emitting diode connected to said controller, said controller controlling power to said light emitting diode for producing said first light output when said switch is in said first ON position and for producing said second light output when said switch is in said second ON position.

81. The flashlight according to claim 80, wherein:
said second light output is brighter than said first light output.

82. The flashlight according to claim 80, wherein:
said controller regulates power to said light emitting diode for providing constant brightness of said first light output and for providing constant brightness of said second light output.

83. The flashlight according to claim 82, wherein:
said controller abruptly reduces power to said light emitting diode when said battery is near exhaustion, for abruptly reducing light output of said light emitting diode.

84. The flashlight according to claim 80, wherein:
said electrical component comprises a resistor.

85. The flashlight according to claim 84, wherein:
said battery is of approximately three volts.

86. The flashlight according to claim 80, wherein:
said electrical component comprises an inductor.

87. The flashlight according to claim 86, wherein:
said battery is of approximately six volts.

88. In a flashlight, the combination comprising:
a battery;
a switch having an OFF position not connected to said battery, a first ON position connected to said battery, and a second ON position connected to said battery;
a light emitter assembly;
a controller in circuit with said battery, said switch and said light emitter assembly, said controller controlling electrical power to said light emitter assembly for producing a first light output when said switch is in said first ON position and for producing a second light output when said switch is in said second ON position; and
a switch actuator coupled to said switch and translatable by a first distance placing said switch in said first ON position and translatable by a second distance placing said switch in said second ON position.

89. The flashlight according to claim 88, wherein:
said switch actuator includes a pushbutton depressible by said first distance placing said switch in said first ON position and depressible by said second distance placing said switch in said second ON position.

90. The flashlight according to claim 88, wherein:
said controller detects when said switch is in said first ON position and in said second ON position.

91. The flashlight according to claim 90, wherein:

said switch actuator includes a pushbutton depressible by said first distance placing said switch in said first ON position and depressible by said second distance placing said switch in said second ON position.

92. A method of indicating near exhaustion of a battery in a flashlight including a light emitter, comprising:

regulating power from the battery to the light emitter for providing constant brightness of light output over time;

detecting near exhaustion of the battery; and abruptly reducing power to the light emitter for providing an abrupt decrease in light output when near exhaustion of the battery is detected.

93. The method according to claim 92, wherein:

during the reducing step, the light output is abruptly reduced to approximately 20% of the light output provided during the regulating step.

94. The method according to claim 92, wherein:

during the regulating step, periodically correcting duty cycle for maintaining said constant brightness of light output over time; and during the detecting step, detecting when the duty cycle is near 100%.

95. The method according to claim 92, including:

after the reducing step, regulating the reduced power to the light emitter for providing constant brightness of the decreased light output.

96. The method according to claim 95, wherein:

during the reducing step, the light output is abruptly reduced to approximately 20% of the light output provided during the regulating step.

97. The method according to claim 95, wherein:

during the regulating step before detecting near exhaustion of the battery, periodically correcting duty cycle for maintaining said constant brightness of light output over time; and during the detecting step, detecting when the duty cycle is near 100%.

98. In a flashlight, the combination comprising:

a battery;

a light emitter assembly;

a switch in circuit with said battery and said light emitter assembly, said switch having an OFF position, a first ON position coupling said battery to said light emitter assembly for producing a first light output, and a second ON position coupling said battery to said light emitter assembly for producing a second light output; and a switch actuator coupled to said switch and translatable by a first distance placing said switch in said first ON position and translatable by a second distance placing said switch in said second ON position.

99. The flashlight according to claim 98, wherein:

said switch actuator includes a pushbutton depressible by said first distance placing said switch in said first ON position and depressible by said second distance placing said switch in said second ON position.

100. The flashlight according to claim 98, wherein:

said switch includes an electrical component in circuit with said battery when said switch is in said first ON position and not in circuit with said battery when said switch is in said second ON position; and said light emitter assembly is responsive to whether or not said electrical component is in circuit with said battery for producing said first light output when said electrical component is in circuit with said battery and for producing said second light output when said electrical component is not in circuit with said battery.

101. The flashlight according to claim 100, wherein:

said electrical component comprises a resistor.

102. The flashlight according to claim 101, wherein:

said resistor is in circuit with said battery when said switch is in said first ON position and is shorted out of said circuit when said switch is in said second ON position.

103. The flashlight according to claim 100, wherein:

said electrical component comprises an inductor.

104. The flashlight according to claim 103, wherein:

said inductor is in circuit with said battery when said switch is in said first ON position, and said inductor is shorted out of said circuit when said switch is in said second ON position.

* * * * *